United States Patent Office 3,746,506
Patented July 17, 1973

3,746,506
CARBON FIBER TREATMENT
Ian Donald Aitken, Gordon Rhodes, and Raymond Anthony Philip Spencer, London, England, assignors to National Research Development Corporation, London, England
No Drawing. Filed Sept. 22, 1971, Ser. No. 182,833
Claims priority, application Great Britain, Sept. 23, 1970, 45,411/70
Int. Cl. D06l 3/06
U.S. Cl. 8—108          7 Claims

ABSTRACT OF THE DISCLOSURE

The adhesion of carbon fibers to the matrix in which they are incorporated is improved by immersing the carbon fibers in an aqueous solution of hypochlorous acid preferably containing from 1.0% to 3.0% by weight of available chlorine, having a pH of from 3.0 to 7.5, particularly from 4.0 to 6.0.

---

The present invention relates to the treatment of carbon fibers, and is an improvement in, or modification of that described and claimed in U.S. application Ser. No. 787,558, now U.S. Pat. No. 3,657,082.

It will be known that carbon fibers may be made by taking fibers of an organic material, such as polyacrylonitrile, and subjecting them to high temperatures. Very often the heat treatment is effected in several steps in different atmospheres and the final temperature may be in the range 1,500 to 2,600° C., so that the fibers may be at least partially graphitised. However, for convenience, the term "carbon fibers" is used inclusively hereinafter.

These carbon fibers may have many uses, but one use is to reinforce a matrix, more particularly a matrix of plastics material, in order to produce a reinforced or laminated material in rather a similar way to that in which glass fiber is used to reinforce plastics material. One difficulty that has been found is that poor adhesion may occur between the carbon fibers and the matrix which leads to reduced mechanical strength of the composite.

The invention of U.S. application Ser. No. 787,558 now U.S. Pat. No. 3,657,082 seeks to overcome this difficulty by subjecting the carbon fibers to a preliminary surface oxidation treatment by immersing them in an aqueous oxidising agent, particularly a hypochlorite solution containing available chlorine. According to our co-pending application, the hypochlorite solution may be generated by electrolysis of a chloride solution using the carbon fibers as the anode.

It is an object of this invention to provide a process suitable for treating large amounts of carbon fiber, either on a batch or a continuous basis. In order to reduce the treatment time, we have found that it is necessary to exercise control over the pH of the hypochlorite solution.

The present invention provides a method of surface treating carbon fibers, which method comprises immersing the carbon fibers in the aqueous solution of hypochlorous acid having a pH of from 3.0 to 7.5 and preferably from 4.0 to 6.0.

It is believed that the necessity for controlling the pH of the aqueous solution arises from the fact that the species which reacts with the carbon fiber is an oxidising species derived from the breakdown of unionised hypochlorous acid. At pHs below 3, the proportion of free chlorine increases until at 1.7 it is equal to the hypochlorous acid concentration. Also, in this lower pH range, the rate of decomposition of the solution is increased. At a pH of 7.5, the molar ratio of hypochlorite ion to free hypochlorous acid is slightly greater than one, and this ratio rises with increasing pH. Within the preferred pH range of 4.0 to 6.0, most of the chlorine is present as hypochlorous acid.

The hypochlorous acid solution may conveniently be obtained by acidifying sodium hypochlorite solution, using any appropriate weak acid, for example, acetic acid.

We prefer to use a rather dilute hypochlorous acid solution containing from 0.5% to 5.0%, preferably from 1.0% to 3.0%, by weight of available chlorine. When the solution contains less than 0.5% by weight of available chlorine, we have found that the treatment is not as effective unless the time is prolonged. There is no advantage to be gained by using solutions containing more than 5.0% by weight of available chlorine—indeed we found no significant difference between solutions containing 1.3% and 2.6% available chlorine—and it is generally preferable to work with dilute solutions.

The hypochlorous acid solution should desirably be at a temperature of from 20° C. to 80° C., preferably from 40° C. to 60° C., during the heat treatment. The optimum treatment temperature in any particular case depends on other factors including the treatment time and the type of fiber being treated. The treatment time will generally be from 1 to 48 hours, preferably from 2 to 6 hours for continuous treatment or for one-day batch treatment, or from 15 to 24 hours for overnight batch treatment. In general, shorter treatment times are appropriate at higher temperatures, and vice versa. Thus, for example, using a solution at pH 5.5 containing 1.3% by weight of available chlorine, the optimum temperature for a 4-hour treatment is in the range 50° C. to 75° C., while the optimum temperature for a 16-hour treatment is in the range 40° C. to 55° C. It is believed that the treatment may depend on the breakdown of hypochlorous acid into e.g. active oxygen or ozone. If this belief is correct, then the use of bath temperatures at which these species are less soluble, i.e. higher temperatures, may be expected to result in a less effective treatment.

Carbon fibers which have been post-heated at temperatures in the range 1500° C. to 2600° C. generally require more severe treatment according to this invention than carbon fibers which have not been so post-heated.

It may also be convenient to pre-clean the carbon fibers by treatment with a conventional cleaning solvent in order to remove any gross surface contamination.

In both the pre-cleaning stage and the aqueous oxidising stage it may be desirable to make use of ultrasonic agitation in order to ensure good contact between the relevant liquid and the fibers.

The efficiency of the method of this invention may conveniently be assessed by measuring the interlaminar shear strength of a laminate formed using the treated carbon fibers. The experimental results which follow were obtained by the following procedure:

Fourteen grams of fiber in 13" lengths were tied into a hank for each treatment.

The hypochlorite solution was made by diluting commercial sodium hypochlorite solution with distilled water (approximately ten times for 1.3 percent available chlorine solution) and glacial acetic acid was added to reduce the pH to 5.5 (or 4.2 in some cases). The oxidizing power was determined by titration against standard sodium thiosulphate solution expressing the results in terms of available chlorine.

The solution was heated to the required temperature and the fiber then immersed for the required time period. After treatment the fiber was gently washed then soaked in distilled water for two hours, finally rinsed and then dried in a hot air oven overnight at 110° C.

Carbon fiber/epoxide resin composites were made using Epikote 828 resin cured with methyl Nadic anhydried hardener and accelerated with benzyl dimethylamine in the proportion of 100:80:1 parts by weight. The fiber loading was 60 percent±1 percent by volume.

All the composites were made in steel moulds which give a bar 13" x 0.5" x 0.1". The required amount of fiber in 13" lengths was weighed and the bundle tied at each end with cotton. The hank of fiber was placed in a ¾" glass tube and heated to 70° C. under vacuum to drive off any moisture; the vacuum was then used to draw up the resin mixture into the tube. When the fiber was fully impregnated it was removed from the tube and the excess resin allowed to drain away.

The hank of fiber was placed in the metal mould and the cotton ties removed. The mould was closed and placed between the platens of a hydraulic press, the temperature was brought up to 125° C. and pressure applied, gently at first, until the mould was fully closed. The composite was then cured at this temperature for two hours.

Shear strength measurements were carried out in a three point bending jig in which the aspect ratio was 5:1 i.e. the span between the outer anvils is 0.5". The load was applied at 0.1 mm./minute and the fracture load noted.

Interlaminar shear strength is calculated as follows:

$$I.L.S.S. = \frac{7.555W}{bd} MN/m.^2 = \frac{0.75W}{bd} kg./mm.^2$$

where $W$ = is the breaking load (kg.)
$b$ = is the sample breadth (mms.)
$d$ = is the sample width (mms.).

Representative results are set out in the following table.

| Example number | Temp., °C. | Time, hours | Concentration, percent available Cl₂ | pH | I./L. shear strength, MN/m.² |
|---|---|---|---|---|---|
| Control | | | | | 19.7 |
| 1 | 25 | 2 | 1.3 | 5.5 | 44.1 |
| 2 | 25 | 24 | 1.3 | 5.5 | 67.3 |
| 3 | 45 | 2 | 1.3 | 5.5 | 55.9 |
| 4 | 55 | 2 | 1.3 | 5.5 | 62.2 |
| 5 | 65 | 2 | 1.3 | 5.5 | 60.5 |
| 6 | 55 | 2 | 2.6 | 5.5 | 61.6 |
| 7 | 25 | 4 | 1.3 | 5.5 | 41.2 |
| 8 | 25 | 4 | 1.3 | 4.2 | 42.0 |
| 9 | 50 | 4 | 1.3 | 5.5 | 72.9 |
| 10 | 75 | 4 | 1.3 | 5.5 | 64.6 |
| 11 | 25 | 16 | 1.3 | 5.5 | 58.1 |
| 12 | 25 | 16 | 1.3 | 4.2 | 56.5 |
| 13 | 50 | 16 | 1.3 | 5.5 | 69.0 |
| 14 | 75 | 16 | 1.3 | 5.5 | 53.4 |
| 15 | 55 | 4 | 2.6 | 5.5 | 65.6 |

The method of this invention does not significantly alter the ultimate tensile strength of the carbon fibers treated.

We claim:
1. A method of surface treating carbon fibers, which method comprises immersing the carbon fibers for a period of from 1 to 48 hours in an aqueous solution of hypochlorous acid containing from 0.5 to 5% by weight of available chlorine and having a pH of from 3.0 to 7.5, wherein, the aqueous solution of hypochlorous acid is maintained at a temperature of from 20° C. to 80° C.
2. A method as claimed in claim 1, wherein the pH of the aqueous solution of hypochlorous acid is from 4.0 to 6.0.
3. A method as claimed in claim 1, wherein the solution of hypochlorous acid contains from 1.0% to 3.0% by weight of available chlorine.
4. A method as claimed in claim 1, wherein the hypochlorous acid solution is at a temperature of from 40° C. to 60° C.
5. A method as claimed in claim 1, wherein the method is operated continuously and the time of immersion is from 2 to 6 hours.
6. A method as claimed in claim 1, wherein ultrasonic agitation is used to ensure good contact between the carbon fibers and the hypochlorous acid solution.
7. Carbon fibers when surface treated by the method claimed in claim 1.

References Cited

UNITED STATES PATENTS 3,657,082   4/1972   Wells et al. _____ 204—130

MAYER WEINBLATT, Primary Examiner

U.S. Cl. X.R.

134—2, 3; 204—130; 423—447